United States Patent
Conn et al.

(10) Patent No.: US 9,930,514 B2
(45) Date of Patent: Mar. 27, 2018

(54) PREDEFINED WIRELESS PAIRING

(71) Applicant: Apple Inc., Cupertino, CA (US)

(72) Inventors: Jason C. Conn, San Francisco, CA (US); Akshay Mangalam Srivatsa, Sunnyvale, CA (US); Craig P. Dooley, Los Gatos, CA (US); Michael J. Giles, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/269,360

(22) Filed: Sep. 19, 2016

(65) Prior Publication Data

US 2017/0006460 A1    Jan. 5, 2017

Related U.S. Application Data

(63) Continuation of application No. 14/474,466, filed on Sep. 2, 2014, now Pat. No. 9,451,438.
(Continued)

(51) Int. Cl.
*H04W 8/00*    (2009.01)
*H04W 12/06*   (2009.01)
(Continued)

(52) U.S. Cl.
CPC ........... *H04W 8/005* (2013.01); *H04W 4/008* (2013.01); *H04W 12/06* (2013.01); *H04W 76/023* (2013.01)

(58) Field of Classification Search
CPC ...... H04W 8/005; H04W 12/06; H04W 4/008
See application file for complete search history.

(56) References Cited

U.S. PATENT DOCUMENTS 6,886,095 B1 * 4/2005 Hind ................... H04L 63/0823
                                                713/168
8,473,577 B2    6/2013 Chan
(Continued)

FOREIGN PATENT DOCUMENTS

| WO | WO 2005/109829 A1 | 11/2005 |
| WO | WO 2015/183403 A1 | 12/2015 |
| WO | WO 2015/183414 A1 | 12/2015 |

OTHER PUBLICATIONS

Bluetooth Specification Version 4.0, Jun. 30, 2010, available at https://www.bluetooth.org/docman/handlers/downloaddoc.ashx?doc_id=229737.*

*Primary Examiner* — Gennadiy Tsvey
(74) *Attorney, Agent, or Firm* — Sterne, Kessler, Goldstein & Fox P.L.L.C.

(57) ABSTRACT

In order to reduce latency and overhead during the device discovery process, operations involved in pairing of two electronic devices may be predefined. In particular, when a user specifies a new electronic device in a list of their electronic devices, a computer provides a notification to these electronic devices. In response to the notification, a given one of the electronic devices generates encryption information and identification information for the given electronic device, and provides this encryption information and identification information to the new electronic device via a network (such as the Internet). Then, the new electronic device generates encryption information and identification information for the new electronic device, and provides this encryption information and identification information to the given electronic device via the network. This pairing information may subsequently facilitate secure wireless communication between the two electronic devices.

20 Claims, 6 Drawing Sheets

Related U.S. Application Data

(60) Provisional application No. 62/005,751, filed on May 30, 2014.

(51) Int. Cl.
*H04W 4/00* (2018.01)
*H04W 76/02* (2009.01)

(56) References Cited

U.S. PATENT DOCUMENTS

| | | |
|---|---|---|
| 8,583,090 B2 | 11/2013 | Vartianen et al. |
| 8,850,052 B2 | 9/2014 | Rosenblatt |
| 8,990,273 B2 | 3/2015 | Iarocci et al. |
| 9,148,842 B2 | 9/2015 | Qi et al. |
| 9,451,438 B2 | 9/2016 | Conn et al. |
| 2003/0110382 A1 | 6/2003 | Leporini et al. |
| 2003/0112789 A1 | 6/2003 | Heinonen et al. |
| 2004/0009748 A1 | 1/2004 | Heinonen et al. |
| 2006/0083187 A1* | 4/2006 | Dekel .............. H04L 63/0853 370/310 |
| 2008/0171561 A1 | 7/2008 | Irony et al. |
| 2011/0225640 A1 | 9/2011 | Ganapathy et al. |
| 2012/0003933 A1 | 1/2012 | Baker et al. |
| 2012/0296986 A1 | 11/2012 | Hassan et al. |
| 2013/0212212 A1 | 8/2013 | Addepalli et al. |
| 2014/0051439 A1 | 2/2014 | Brownworth |
| 2014/0078949 A1 | 3/2014 | Chu |
| 2014/0112323 A1 | 4/2014 | Qi et al. |
| 2015/0103756 A1 | 4/2015 | Sinha |
| 2015/0350355 A1 | 12/2015 | Linn et al. |
| 2015/0350356 A1 | 12/2015 | Linn et al. |
| 2015/0351038 A1 | 12/2015 | Dooley et al. |
| 2015/0373084 A1 | 12/2015 | Krochmal et al. |
| 2016/0029153 A1 | 1/2016 | Linn et al. |

\* cited by examiner

PREDEFINED WIRELESS PAIRING

CROSS-REFERENCE TO RELATED APPLICATIONS

This application is a continuation of U.S. patent application Ser. No. 14/474,466, filed on Sep. 2, 2014, entitled Predefined Wireless Pairing ("'466 Application"), which is incorporated herein by reference in its entirety.

The '466 Application in turn claims priority to U.S. Provisional Patent Application No. 62/005,751, filed on May 30, 2014, entitled Predefined Wireless Pairing ('751 Application") which is incorporated herein by reference in its entirety.

This application is related to the following applications below which are incorporated herein by reference in their entirety: U.S. Provisional Patent Application No. 62/005,755, filed on May 30, 2014, entitled Operating-Mode Transitions Based on Advertising Information; U.S. Provisional Patent Application No. 62/005,781, filed on May 30, 2014, entitled Activity Continuation Between Electronic Devices; and U.S. Provisional Application No. 62/005,793, filed on May 30, 2014, entitled Companion Application for Activity Cooperation.

BACKGROUND

Field

The described embodiments relate to techniques for pairing electronic devices in a wireless network.

Related Art

Many modern electronic devices include a networking subsystem that is used to wirelessly communicate with other electronic devices. For example, these electronic devices can include a networking subsystem with a cellular network interface (UMFS, LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface.

In many wireless-communication protocols, electronic devices detect each other by regularly broadcasting beacons and scanning for the beacons from other electronic devices. For example, an electronic device that communicates using a communication protocol that is compatible with Bluetooth™ may wake up its radio periodically to receive a beacon frame at beacon transmission times.

However, regularly transmitting and receiving these beacons typically results in significant power consumption by the networking subsystems. In addition, there is a time delay before a transmitting electronic device and a receiving electronic device are paired. Therefore, the existing detection techniques in wireless networks may reduce the operating time of the electronic device and can increase latency, which can degrade the user experience.

SUMMARY

The described embodiments include a first electronic device. This first electronic device includes: a processor, and an interface circuit that communicates with other electronic devices. During operation, the interface circuit receives information specifying a second electronic device, where the first electronic device and the second electronic device are associated with an account. Next, the interface circuit and/or the processor provide, to the second electronic device (such as via an Internet server), a request to pair with the second electronic device. In response, the interface circuit receives (such as via the Internet server), from the second electronic device, identification information and encryption information associated with hardware for the second electronic device. Then, the interface circuit and/or the processor: generates identification information and encryption information associated with hardware for the first electronic device; and provides (such as via the Internet server) the identification information and the encryption information to the second electronic device to facilitate establishing a wireless connection between the first electronic device and the second electronic device. Thus, by exchanging the identification information and the encryption information via this Internet or cloud-based approach, the first electronic device and the second electronic device can subsequently establish the wireless connection (such as a Bluetooth™ pairing).

In some embodiments, the identification information and the encryption information for the second electronic device may facilitate establishing the wireless connection when the first electronic device and the second electronic device are within wireless communication range. Furthermore, during wireless communication with the second electronic device, the interface circuit may convert a dynamically generated address of the second electronic device into a public address of the second electronic device using the identification information for the second electronic device. Note that the information specifying the second electronic device may be received via a different communication channel than the wireless communication with the second electronic device.

Moreover, the identification information and the encryption information for the second electronic device may be associated with a media access control (MAC) address of the second electronic device, and the identification information and the encryption information for the first electronic device may be associated with a MAC address of the first electronic device.

Subsequently, the interface circuit may receive information indicating the second electronic device is no longer associated with the account. In response, the interface circuit may remove the identification information and the encryption information for the second electronic device.

Furthermore, the information specifying the second electronic device may be received from a computer, which is other than the second electronic device, and the computer may be associated with the account.

Another embodiment provides the first electronic device that exchanges wireless-pairing information with the second electronic device via a network (such as the Internet), and subsequently establishes wireless-pairing with the second electronic device based on the wireless-pairing information.

Another embodiment provides a method for pairing the first electronic device and the second electronic device. This method includes at least some of the operations performed by the first electronic device.

Another embodiment provides a system that includes: the first electronic device, the computer and the second electronic device.

Another embodiment provides the second electronic device. This second electronic device includes: an interface circuit that communicates with other electronic devices. During operation, the interface circuit provides, to the computer, registration information specifying the second electronic device. Next, the interface circuit receives, from the first electronic device, the request to pair with the second electronic device, where the first electronic device and the second electronic device are associated with an account. Then, the interface circuit generates identification information and encryption information associated with hardware for the second electronic device. Moreover, the interface circuit provides, to the first electronic device, the identification information and the encryption information for the second electronic device. In response, the interface circuit receives, from the first electronic device, the identification information and the encryption information associated with hardware for the first electronic device to facilitate establishing a wireless connection between the first electronic device and the second electronic device.

In some embodiments, the identification information and the encryption information for the first electronic device may facilitate establishing the wireless connection when the first electronic device and the second electronic device are within wireless communication range. Furthermore, during wireless communication with the first electronic device, the interface circuit may convert a dynamically generated address of the first electronic device into a public address of the first electronic device using the identification information for the first electronic device. Note that the information specifying the first electronic device may be received via a different communication channel than the wireless communication with the first electronic device.

Moreover, the identification information and the encryption information for the first electronic device may be associated with the MAC address of the first electronic device, and the identification information and the encryption information for the second electronic device may be associated with the MAC address of the second electronic device.

Subsequently, the interface circuit may receive information indicating the first electronic device is no longer associated with the account. In response, the interface circuit may remove the identification information and the encryption information for the first electronic device.

Furthermore, the computer may be other than the second electronic device, and the computer may be associated with the account.

Another embodiment provides a method for pairing the first electronic device and the second electronic device. This method includes at least some of the operations performed by the second electronic device.

Figure 1:
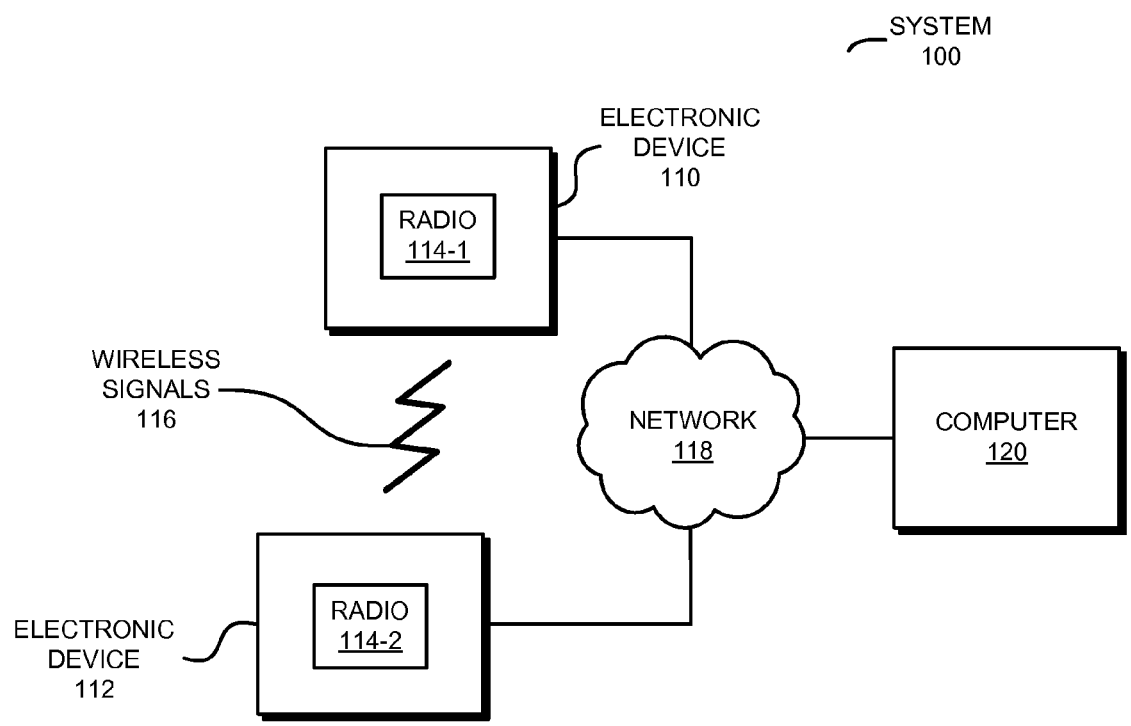
FIG. 1 is a block diagram illustrating a system in which electronic devices wirelessly communicate in accordance with an embodiment of the present disclosure.

Table 1 provides an illustration of a first message during communication between the electronic devices of FIG. 1 in accordance with an embodiment of the present disclosure.

Table 2 provides an illustration of a first message during communication between the electronic devices of FIG. 1 in accordance with an embodiment of the present disclosure.

Table 3 provides an illustration of a first message during communication between the electronic devices of FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to reduce latency and overhead during the device discovery process, pairing of two electronic devices may be predefined so that the electronic devices can communicate with each other when they are in proximity to each other. In particular, when a user specifies a new electronic device in a list of their electronic devices, a computer provides a notification to these electronic devices. In response to the notification, a given one of the electronic devices generates encryption information and identification information for the given electronic device, and provides this encryption information and identification information to the new electronic device via a network (such as the Internet). Then, the new electronic device generates encryption information and identification information for the new electronic device, and provides this encryption information and identification information to the given electronic device via the network. Subsequently, when these two electronic devices are in proximity to each other, the encryption information and the identification information can be used to facilitate secure wireless communication between the two electronic devices.

For example, the wireless communication may include packets that are transmitted and received by radios in the electronic devices in accordance with a communication protocol, such as: an Institute of Electrical and Electronics Engineers (IEEE) 802.11 standard, Bluetooth™ (from the Bluetooth Special Interest Group of Kirkland, Wash.), and/or another type of wireless interface. In the discussion that follows, Bluetooth™ Low Energy (Bluetooth™ LE) is used as an illustrative example.

The communication between the electronic devices is shown in FIG. 1, which presents a block diagram illustrating system 100 with wireless communication between electronic devices 110 and 112. In particular, these electronic devices may wirelessly communicate while: detecting one another by scanning wireless channels, transmitting and receiving beacons or beacon frames on wireless channels, establishing connections (for example, by transmitting connect requests), and/or transmitting and receiving packets (which may include the request and/or additional information as payloads).

Figure 2:
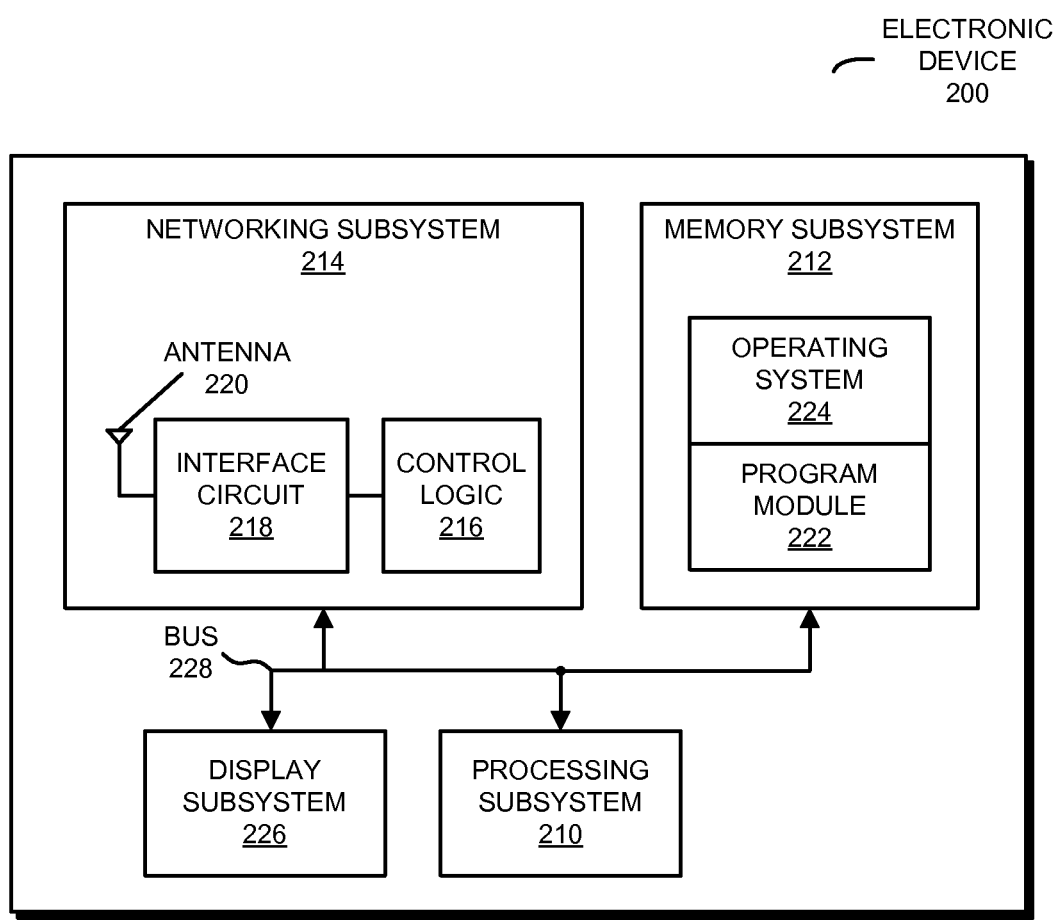
FIG. 2 is a block diagram illustrating one of the electronic devices of FIG. 1 in accordance with an embodiment of the present disclosure.

As described further below with reference to FIG. 2, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting beacons on wireless channels to enable electronic devices to make initial contact with or detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are transmitted from a radio 114-1 in electronic device 110. These wireless signals 116 are received by radio 114-2 in electronic device 112. In particular, electronic device 110 may broadcast or transmit beacons at transmit times. In turn, electronic device 112 (such as a smartphone) may receive one or more beacons, thereby detecting the presence of electronic device 110, by opening scan windows during the transmit times. This may allow electronic devices 110 and 112 to optionally establish a connection and communicate with each other.

However, regularly transmitting and receiving beacons may require the networking subsystems (such as interface circuits) in electronic devices 110 and 112 to be in active or a high power-consumption mode more often and/or for a longer duration, which may increase the power consumption and decrease the operating time of electronic devices 110 and 112. In addition, there is typically a time delay before electronic device 110 and electronic device 112 are paired.

In the pairing technique described below, the pairing of electronic devices 110 and 112 may be predefined using, at least in part, out-of-band communication. This predefined pairing may facilitate wireless communication between electronic devices 110 and 112 when electronic devices 110 and 112 are within range of each other. Consequently, the pairing technique may reduce the power consumption and the latency associated with pairing of electronic devices 110 and 112. In addition, the use of out-of-band communication during the pairing may increase the security of the pairing technique and, thus, the subsequent wireless communication between electronic devices 110 and 112 (e.g., by eliminating or reducing the likelihood of sniffing).

In particular, when a user acquires a new electronic device (such as electronic device 112), the user may access computer 120 via network 118. Computer 120 may be associated with or operate on behalf of a provider of electronic devices 110 and/or 112. Moreover, computer 120 may provide a portal or website that the user may use to manage an account of the user. This account may include account information (such as registration information) specifying the electronic devices that the user owns. For example, the account information may include a list of electronic devices associated with the user. Initially, this list may include electronic device 110. However, after the user acquires electronic device 112, the user may update the account information to specify electronic device 112.

In response, computer 120 may provide a notification, via network 118, to the other electronic devices that are specified in the account information. In this case, the notification may be provided to electronic device 110.

When electronic device 110 receives the notification, it may provide a request to pair to electronic device 112. This request may be communicated via network 118 and/or wireless communication between electronic devices 110 and 112.

Then, electronic device 112 may generate identification information (such as an identity resolving key) and encryption information (such as a symmetric or an asymmetric encryption key, a secure one-way hashing function, etc.) for electronic device 112, where the identification information and the encryption information for electronic device 112 are associated with hardware in electronic device 112. For example, the identification information and the encryption information may be associated with a media access control (MAC) address of electronic device 112. Moreover, electronic device 112 may communicate the identification information and the encryption information for electronic device 112 to electronic device 110 (e.g., via network 118 and/or wireless communication between electronic devices 110 and 112).

Next, electronic device 110 may generate identification information and encryption information for electronic device 110, where the identification information and the encryption information for electronic device 110 are associated with hardware in electronic device 110. For example, the identification information and the encryption information may be associated with a MAC address of electronic device 110. Furthermore, electronic device 110 may communicate the identification information and the encryption information for electronic device 110 to electronic device 112 (e.g., via network 118 and/or wireless communication between electronic devices 110 and 112).

Because electronic devices 110 and 112 have a predefined pairing, when either electronic device detects the other, they can securely communicate with each other using the encryption information in an established connection between electronic devices 110 and 112. In addition, in some embodiments advertisements for connections transmitted by electronic devices 110 and/or 112 use a dynamically generated address (such as a random number). This dynamically generated address may be changed after an elapsed time (such as 15 minutes). Using the identification information, the dynamically generated address can be converted into the public address of electronic devices 110 and/or 112, which is not broadcast. This conversion may allow electronic devices 110 and 112 to determine that it is safe to connect with each other even when dynamically generated addresses are used, because both electronic devices 110 and 112 will know each other's identity before connecting.

If the user subsequently updates the account information to indicate that electronic device 110 or 112 is no longer associated with the account, computer 120 may provide a notification to the other electronic devices in the list indicating this change. For example, if the user indicates that electronic device 112 is no longer associated with the account (such as if the user no longer owns electronic device 112), electronic device 110 may receive, via network 118, the notification. In response, electronic device 110 may remove the identification information and the encryption information for electronic device 112, thereby removing the predefined pairing between electronic devices 110 and 112.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of an electronic device. FIG. 2 presents a block diagram illustrating an electronic device 200, such as one of electronic devices 110 and 112 in FIG. 1. This electronic device includes processing subsystem 210, memory subsystem 212, and networking subsystem 214. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 222 or operating system 224), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including: control logic 216, an interface circuit 218 and an antenna 220. For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 200 may use the mechanisms in networking subsystem 214 for performing simple wireless communication between the electronic devices, e.g., transmitting advertising or beacon frames and/or scanning for advertising frames transmitted by other electronic devices as described previously.

Within electronic device 200, processing subsystem 210, memory subsystem 212, and networking subsystem 214 are coupled together using bus 228. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections between the subsystems.

In some embodiments, electronic device 200 includes a display subsystem 226 for displaying information on a display, which may include a display driver and the display, such as a liquid-crystal display, a multi-touch touchscreen, etc.

Electronic device 200 can be (or can be included in) any electronic device with at least one network interface. For example, electronic device 200 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 200, in alternative embodiments, different components and/or subsystems may be present in electronic device 200. For example, electronic device 200 may include one or more additional processing subsystems 210, memory subsystems 212, networking subsystems 214, and/or display subsystems 226. Additionally, one or more of the subsystems may not be present in electronic device 200. Moreover, in some embodiments, electronic device 200 may include one or more additional subsystems that are not shown in FIG. 2. For example, electronic device 200 can include, but is not limited to, a data collection subsystem, an audio and/or video subsystem, an alarm subsystem, a media processing subsystem, and/or an input/output (I/O) subsystem. Also, although separate subsystems are shown in FIG. 2, in some embodiments, some or all of a given subsystem or component can be integrated into one or more of the other subsystems or component(s) in electronic device 200. For example, in some embodiments program module 222 is included in operating system 224.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214, such as a radio. Moreover, the integrated circuit may include hardware and/or software mechanisms that are used for transmitting wireless signals from electronic device 200 and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the described single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the Bluetooth™ standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the pairing technique may be implemented using networking subsystem 214 (such as in physical layer hardware in interface circuit 218). Alternatively or additionally, at least some of the operations in the pairing technique may be implemented using: program module 222, operating system 224 (such as a driver for interface circuit 218) and/or in firmware in interface circuit 218.

Figure 3:
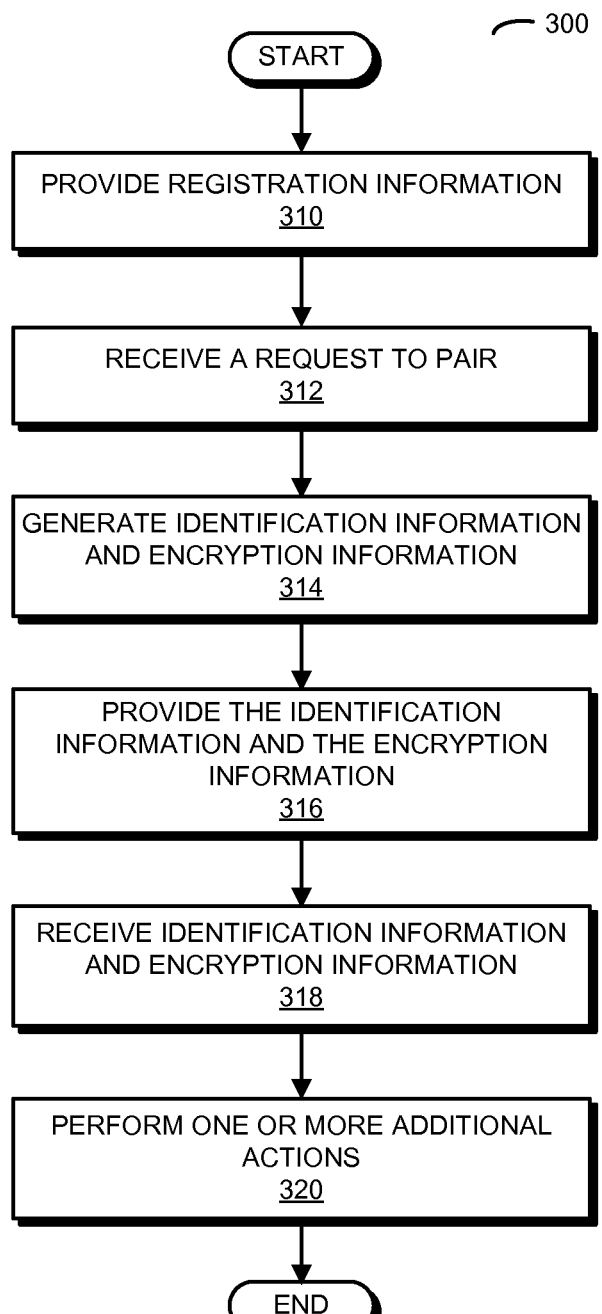
FIG. 3 is a flow diagram illustrating a method for pairing two of the electronic devices in FIG. 1 in accordance with an embodiment of the present disclosure.

FIG. 3 presents a flow diagram illustrating method 300 for pairing two of the electronic devices in FIG. 1, such as electronic devices 110 and 112. Note that operations in method 300 may be performed by an interface circuit in an electronic device, such as interface circuit 218 (FIG. 2) in electronic device 112 (FIG. 1).

During operation, the interface circuit provides, to a computer, registration information (operation 310) specifying a second electronic device. Then, the interface circuit receives, from a first electronic device, a request to pair (operation 312) with the second electronic device, where the first electronic device and the second electronic device are associated with an account. Moreover, the interface circuit generates identification information and encryption information (operation 314) for the second electronic device, where the identification information and the encryption information for the second electronic device are associated with hardware in the second electronic device.

Furthermore, the interface circuit provides, to the first electronic device, the identification information and the encryption information (operation 316) for the second electronic device. Next, the interface circuit receives, from the first electronic device, identification information and encryption information (operation 318) for the first electronic device to facilitate establishing a wireless connection between the first electronic device and the second electronic device, where the identification information and the encryption information for the first electronic device are associated with hardware in the first electronic device.

In some embodiments, the interface circuit performs one or more additional actions (operation 320). For example, the interface circuit may receive information indicating the first electronic device is no longer associated with the account. In response, the interface circuit may remove the identification information and the encryption information for the first electronic device.

Figure 4:
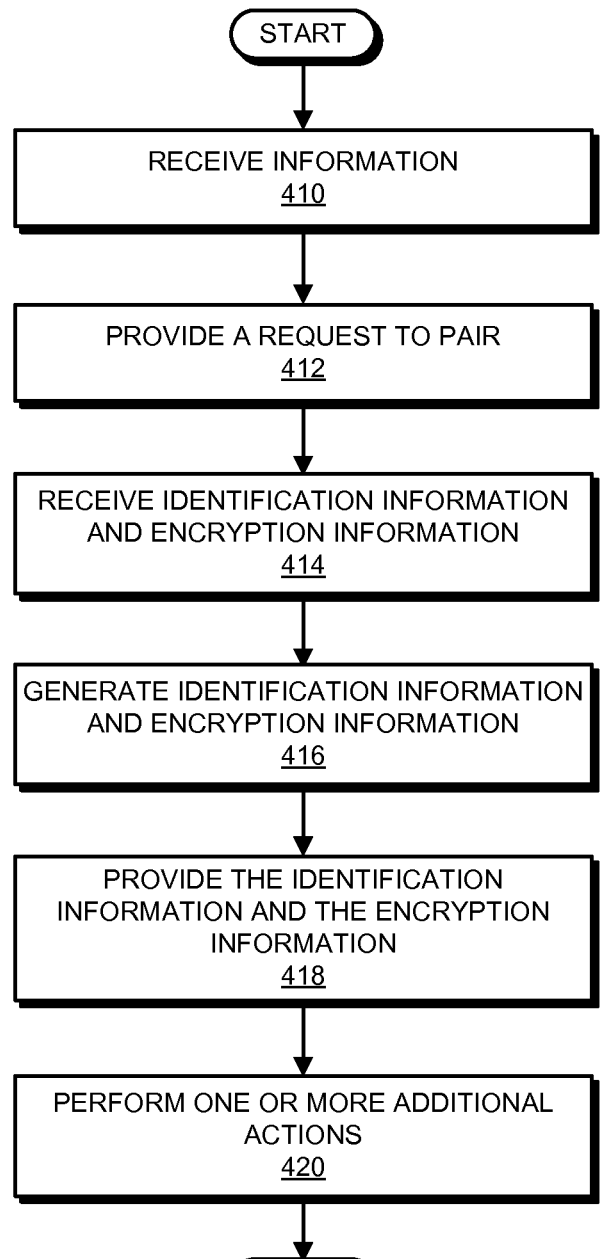
FIG. 4 is a flow diagram illustrating a method for pairing two of the electronic devices of FIG. 1 in accordance with an embodiment of the present disclosure.

FIG. 4 presents a flow diagram illustrating a method for pairing two of the electronic devices in FIG. 1, such as electronic devices 110 and 112. Note that operations in method 400 may be performed by an interface circuit in an electronic device, such as interface circuit 218 (FIG. 2) in electronic device 110 (FIG. 1).

During operation, the interface circuit receives information (operation 410) specifying the second electronic device, where the first electronic device and the second electronic device are associated with the account. Then, the interface circuit provides, to the second electronic device, the request to pair (operation 412) with the second electronic device. Moreover, the interface circuit receives, from the second electronic device, the identification information and the encryption information (operation 414) for the second electronic device, where the identification information and the encryption information for the second electronic device are associated with hardware in the second electronic device.

Furthermore, the interface circuit generates the identification information and the encryption information (operation 416) for the first electronic device, where the identification information and the encryption information for the first electronic device are associated with hardware in the first electronic device. Next, the interface circuit provides the identification information and the encryption information (operation 418) for the first electronic device to the second electronic device to facilitate establishing a wireless connection between the first electronic device and the second electronic device.

In some embodiments, the interface circuit performs one or more additional actions (operation 420). For example, the interface circuit may receive information indicating the second electronic device is no longer associated with the account. In response, the interface circuit may remove the identification information and the encryption information for the second electronic device.

In these ways, the electronic devices (for example, interface circuits and/or drivers in the electronic devices) may facilitate communication between the electronic devices with reduced power consumption, reduced detection times and enhanced security. In particular, by predefining the pairing, advertising or broadcast and detection may be significantly reduced so that the electronic devices spend less time in a high power-consumption mode. In addition, the identification information and the encryption information may facilitate secure wireless communication between the electronic devices.

In some embodiments of methods 300 (FIG. 3) and 400, there may be additional or fewer operations. Moreover, the order of the operations may be changed, and/or two or more operations may be combined into a single operation.

In an exemplary embodiment, the pairing technique enables automatic pairing between all electronic devices associated with an account (such as an account with a provider of one or more of the electronic devices). When a user specifies that a new electronic device is associated with the account, notifications (and, more generally, messages) may be provided to the other electronic devices associated with the account, which starts the automatic pairing of the electronic devices.

The automatic pairing involves a series of handshaking messages that result in the generation and exchange of Bluetooth™ encryption and identification keys. The electronic devices with the predefined pairing can auto-connect when they are in range of each other. For example, a Bluetooth™ LE or a Bluetooth™ radio connection may be used, and the two electronic devices may hop at the same frequencies based on the exchanged information.

The automatic pairing may be facilitated by a daemon executing in the background on computer 120 (FIG. 1) that initiates this process. This daemon: may isolate external dependencies, may maintain a logical separation of code, and can be launch-on-demand (so that the pairing is event driven).

The automatic pairing technique may begin when a new electronic device joins an account of a user. When this happens, the auto-pairing daemon may query computer 120 (FIG. 1) or an identification server for a list of electronic devices associated with the account. Then, pairing is initiated with all the electronic devices in the list. In particular, a Bluetooth™ auto-pairing daemon is launched on demand. This Bluetooth™ auto-pairing daemon then queries computer 120 (FIG. 1) for the list of electronic devices, and sends notifications or messages to the electronic devices (other than the new electronic device). Note that the pairing technique may be efficient in terms of time and power consumption and, as described further below, may include four messages.

Figure 5:
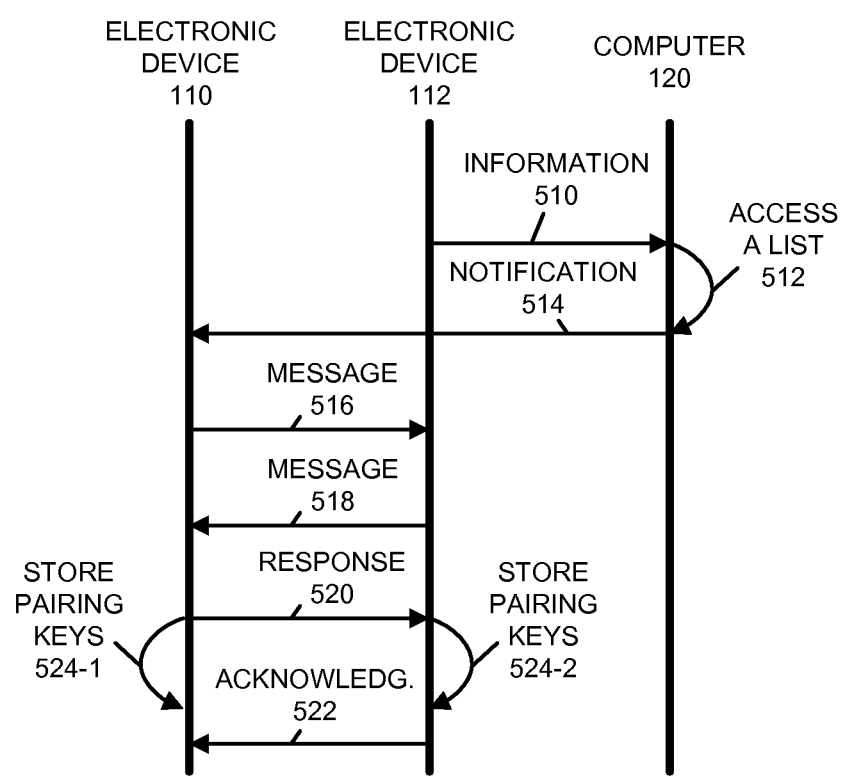
FIG. 5 is a drawing illustrating communication between the electronic devices of FIG. 1 in accordance with an embodiment of the present disclosure.

The pairing technique is further illustrated in FIG. 5, which presents a drawing illustrating communication between electronic devices 110 and 112 (FIG. 1). In particular, electronic device 112 may provide information 510 to computer 120 that specifies that electronic device 112 is associated with an account of a user of electronic device 112. Then, computer 120 may access a list 512 to determine that electronic device 110 is also associated with the account, and computer 120 may send a notification 514 to electronic device 110.

In response to notification 514, electronic device 110 may send an initial message 516 to electronic device 112. This initial message is a pairing request, which may include the public address and capabilities of electronic device 110. Note that the capabilities may include: the protocol version, the desired pairing encryption and/or identification keys (which are sometimes referred to as 'pairing keys'), and the desired long-term encryption-key LTK length (which is sometimes referred to as a 'key length').

Next, electronic device 112 may provide a message 518 with: the public address of electronic device 112, the capabilities described previously, and the pairing keys that were requested by electronic device 110. These pairing keys may be generated using the same hardware and/or software that are used during a normal pairing exchange.

Moreover, electronic device 110 may provide a response 520 with the requested pairing keys. Furthermore, electronic device 112 may send an acknowledgment 522 and electronic devices 110 and 112 may store the pairing keys 524 (i.e., the pairing keys may or may not be stored by electronic device 112 until a response 520 is received).

Tables 1-3 provide an illustration of the first three messages (including key-value pairs) during communication between electronic devices 110 and 112. Note that the encrypted diversifier in Table 2 may be used for co-signing. Also note that the third message may include both the requested pairing keys and the received pairing keys, so that the new electronic device does not need to store the generated pairing keys until the third message is received (i.e., the predefined pairing is completed).

TABLE 1

| Message type | Cloud pairing | |
|---|---|---|
| Version 1 | | |
| | Message type | Pairing request |
| | Name | Jason's cell phone |
| | Public address | AA:BB:CC:DD:EE:FF |
| | Encryption type | ECDH, Basic |
| | Requested keys | Encryption, Identification |
| | Key length | 128 bit |

TABLE 2

| Message type | Cloud pairing | |
|---|---|---|
| Version 1 | | |
| | Message type | Pairing response |
| | Name | Jason's computer |
| | Public address | AA:BB:CC:DD:EE:FF |
| | Encryption type | ECDH, Basic |
| | Requested keys | |
| | LTK | 16 bytes |
| | LTK length | 128 bit |
| | Encrypted diversifier (EDIV) | 2 bytes |
| | Random number (RAND) | 8 bytes |
| | Identification key | 16 bytes |

TABLE 3

| Message type | Cloud pairing | |
|---|---|---|
| Version 1 | | |
| | Message type | Key distribution |
| | Name | Jason's cell phone |
| | Public address | AA:BB:CC:DD:EE:FF |
| | Encryption type | ECDH, Basic |
| | Received keys | |
| | LTK | 16 bytes |
| | LTK length | 128 bit |
| | Encrypted diversifier (EDIV) | 2 bytes |
| | Random number (RAND) | 8 bytes |
| | Identification key | 16 bytes |
| | Requested keys | |
| | LTK | 16 bytes |
| | LTK length | 128 bit |
| | Encrypted diversifier (EDIV) | 2 bytes |
| | Random number (RAND) | 8 bytes |
| | Identification key | 16 bytes |

Using a network to pair electronic devices may also help prevent unilateral unpairing. In particular, when an electronic device is unpaired, computer 120 (FIG. 1) may send it a message telling it to remove the stored pairing keys. Moreover, if the user changes or removes the account entirely, this unpairing message may be sent to all of the other electronic devices that are associated with that account.

Figure 6:
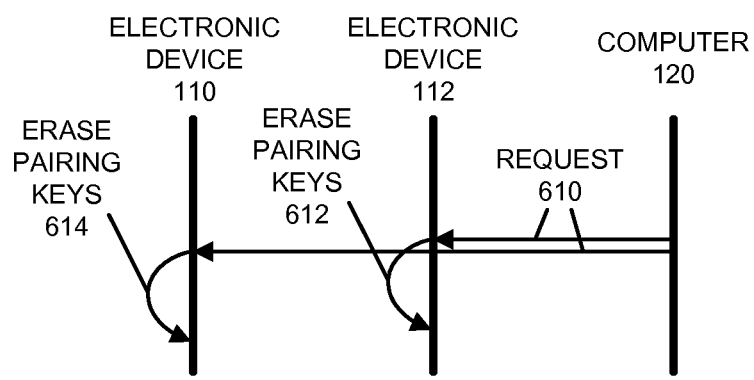
FIG. 6 is a drawing illustrating communication between the electronic devices of FIG. 1 in accordance with an embodiment of the present disclosure.

The pairing technique is further illustrated in FIG. 6, which presents a drawing illustrating communication between electronic devices 110 and 112 (FIG. 1). In particular, computer 120 may send an unpairing request 610 to electronic device 112 (and/or electronic device 110), which then erases stored pairing keys 612 that are associated with a predefined pairing between electronic devices 110 and 112. This unpairing request may include: the public address of electronic device 110 and the LTK. In addition, electronic device 110 may erase stored pairing keys 614 that are associated with the predefined pairing.

While the preceding embodiments illustrated the pairing technique with electronic devices associated with an account of a user, in other embodiments the pairing technique may be used to predefine pairing between electronic devices associated with different accounts and/or different users. For example, the pairing may occur if account identifiers for the different accounts (and, more generally, authorization from the users) are available.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A first electronic device, comprising:
   one or more processors;
   a memory communicatively coupled to the one or more processors, wherein the one or more processors are configured to:
     receive from a second electronic device via a network, a request to pair with the first electronic device, wherein the first electronic device and the second electronic device are associated with an account, wherein the request comprises requested pairing keys;
     in response to the request received and prior to establishing a short range wireless connection between the first electronic device and the second electronic device, generate the requested pairing keys;
     provide to the second electronic device via the network, the requested pairing keys generated by the first electronic device without storing the requested pairing keys generated by the first electronic device;
     receive from the second electronic device via the network, identification information and encryption information associated with the second electronic device, and the requested pairing keys generated by the first electronic device; and
     store at least the requested pairing keys generated by the first electronic device received, to facilitate establishing the short range wireless connection between the first electronic device and the second electronic device.

2. The first electronic device of claim 1, wherein the one or more processors are configured to:
   determine that the first electronic device and the second electronic device are within range of one another; and
   establish the short range wireless connection utilizing the identification information and the encryption information for the second electronic device.

3. The first electronic device of claim 2, wherein the one or more processors are further configured to convert a dynamically generated address of the second electronic device into a public address of the second electronic device using the identification information for the second electronic device.

4. The first electronic device of claim 3, wherein the one or more processors are further configured to:
   receive an unpairing request comprising the public address of the second electronic device and a long-term encryption-key; and
   erase the requested pairing keys generated by the first electronic device stored.

5. The first electronic device of claim 2, wherein the identification information and the encryption information for the second electronic device are received via a different communication channel than the short range wireless connection with the second electronic device.

6. The first electronic device of claim 1, wherein the identification information and the encryption information for the second electronic device are associated with a media access control (MAC) address of the second electronic device.

7. The first electronic device of claim 1, wherein the one or more processors are further configured to:
   receive information indicating the second electronic device is no longer associated with the account; and
   remove the identification information and the encryption information for the second electronic device.

8. The first electronic device of claim 1, wherein to join the account, the one or more processors are configured to:
   provide to a computer device, registration information of the first electronic device, wherein the computer device is other than the second electronic device.

9. The first electronic device of claim 8, wherein the computer device is associated with the account.

10. The first electronic device of claim 8, wherein the computer device is configured to query an identification server for a list of electronic devices associated with the account.

11. The first electronic device of claim 10, wherein to query the identification server, the computer device comprises a daemon executing in a background of the computer device that is launched upon registration of the first electronic device.

12. The first electronic device of claim 1, wherein the one or more processors are further configured to:
   store at least the encryption information associated with the second electronic device received from the second electronic device.

13. A method for pairing a first electronic device and a second electronic device, performed by the first electronic device, comprising:
   joining an account;
   receiving, from the second electronic device via a network, a request to pair with the first electronic device, wherein the request comprises requested pairing keys and a desired long-term encryption key length, and wherein the first electronic device and the second electronic device are associated with the account;
   prior to establishing a short range wireless connection between the first electronic device and the second electronic device, generating the requested pairing keys;
   providing, to the second electronic device via the network, the requested pairing keys generated by the first electronic device and the desired long-term encryption key length for the first electronic device without storing the requested pairing keys generated by the first electronic device;

receiving from the second electronic device via the network, identification information and encryption information associated with the second electronic device, and the requested pairing keys generated by the first electronic device; and storing at least the requested pairing keys generated by the first electronic device received, to facilitate establishing the short range wireless connection between the first electronic device and the second electronic device.

14. The method of claim 13, further comprising:

determining that the first electronic device and the second electronic device are within range of each other; and establishing the short range wireless connection utilizing the identification information and the encryption information for the second electronic device.

15. The method of claim 13, wherein the joining the account comprises:

providing to a computer, registration information of the first electronic device, wherein the computer is other than the second electronic device.

16. The method of claim 15, wherein the computer is associated with the account.

17. A non-transitory computer-readable medium storing instructions that, when executed by a processor of a first electronic device, cause the processor to perform operations, the operations comprising:

joining a first account, wherein the first electronic device is authorized to predefine pair with a second electronic device associated with a second account wherein the first and second accounts are different;

receiving from the second electronic device via a network, a request to pair with the first electronic device, wherein the request comprises requested pairing keys;

generating identification information and the requested pairing keys;

prior to establishing a short range wireless connection between the first electronic device and the second electronic device, providing to the second electronic device via the network, the generated identification information, the requested pairing keys generated by the first electronic device without storing the requested pairing keys generated by the first electronic device, and an encrypted diversifier used for co-signing;

receiving from the second electronic device via the network, identification information and encryption information associated with the second electronic device, and the requested pairing keys generated by the first electronic device;

storing at least the requested pairing keys generated by the first electronic device received; and establishing Bluetooth™-pairing between the first electronic device and the second electronic device based at least in part on the received identification information and encryption information for the second electronic device.

18. The non-transitory computer-readable medium of claim 17, wherein the establishing operation further comprises:

determining that the first electronic device and the second electronic device are within range.

19. The non-transitory computer-readable medium of claim 17, wherein the identification information and the encryption information for the second electronic device are associated with a media access control (MAC) address of the second electronic device.

20. The non-transitory computer-readable medium of claim 17, the operations further comprising:

receiving information indicating the second electronic device is no longer associated with the second account; and removing the identification information and the encryption information for the second electronic device.

* * * * *